Figure 1:
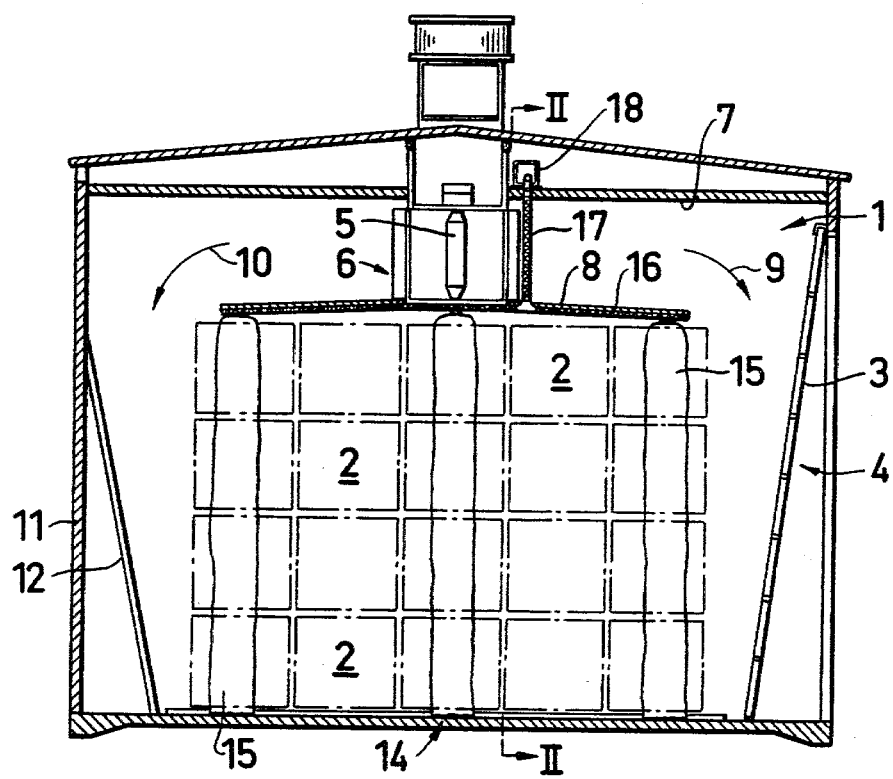

United States Patent [19]

Lövgren

[11] 4,205,461
[45] Jun. 3, 1980

[54] SEALING DEVICE

[75] Inventor: Anders Lövgren, Skellefteå, Sweden

[73] Assignee: Utec AB, Skellefteå, Sweden

[21] Appl. No.: 895,764

[22] Filed: Apr. 12, 1978

[30] Foreign Application Priority Data

Apr. 12, 1977 [SE] Sweden ........................ 7704169
Mar. 8, 1978 [SE] Sweden ........................ 7802654

[51] Int. Cl.² .................... F26B 25/00; F27D 1/00
[52] U.S. Cl. .................................... 34/242; 432/242
[58] Field of Search ................. 206/522; 277/34.3; 34/242, 51; 432/242

[56] References Cited

U.S. PATENT DOCUMENTS

| | | | |
|---|---|---|---|
| 2,977,106 | 3/1961 | Duff | 34/242 |
| 3,018,561 | 1/1962 | Wells | 34/51 |
| 3,501,868 | 3/1970 | Ganzinotti | 277/34.3 |
| 3,598,416 | 8/1971 | Stock et al. | 277/34.3 |
| 3,949,879 | 4/1976 | Peterson et al. | 206/522 |
| 4,054,411 | 10/1977 | Beck | 34/242 |
| 4,093,068 | 6/1978 | Smrt | 206/522 |

*Primary Examiner*—John J. Camby

[57] ABSTRACT

A sealing device for sealing the gap between two spaced, adjacent surfaces is disclosed. The device comprises an inflatable flexible hose disposed within the gap and which, when inflated, completely fills the gap to effect a seal. The hose may be secured to one of the surfaces and will, when evacuated, lie substantially flat against this surface in an unobtrusive position.

14 Claims, 4 Drawing Figures

SEALING DEVICE

This invention relates to a sealing device for sealing a gap between two surfaces, which face toward and may be spaced from each other. The device according to the invention can be applied in timber driers to prevent drying air circulation at least outside the ends of the drying package of timber supplied into the drying chamber. The device also may be utilized as a so-called weather sealing between two units, one of which may be movable, for example between a covered cargo space on a truck, trailer, railway-carriage etc. and a door opening in a store-house, cold store or the like, or between a passenger sluiceway and an opening in an airplane, ship or the like, in order to prevent the inflow and/or outflow of air during loading and unloading, to prevent draught and ice formation at winter time and the penetration of rain and snow.

Sealing devices for such purposes are known previously in the form of rubber compressible strips, which are and must be broader thicker than the distance between the two surfaces they are intended to seal. This implies that when, for example, a timber package is introduced into or removed from a drying chamber provided with such sealing strips, or when, for example, the covered cargo space of a truck approaches a door opening provided with such sealing strips or when the cargo space is separated from said opening by removing the truck therefrom, the sealing strips constitute obstacles and are subjected to impacts and other stresses, which often result in the strips being damaged and torn off from their mountings. A further disadvantage of said sealing strips is that the surfaces, between which the strips are supposed to seal, must be substantially straight and have parallel faces, because otherwise these strips would not have a satisfactory sealing effect.

The object of the present invention, therefore, is to provide an improved device for sealing between two surfaces facing toward each other, which device does not posses the disadvantages of the known rubber strips, but is of such a nature as to bring about effective sealing between the surfaces even when they are not planar and not parallel but are spaced non-uniformly relative to one another, not constitute a direct obstacle and not be exposed to great risk of damage during the periods when it is not utilized directly as a seal.

These and other objects of the invention are achieved thereby that the present sealing device has been given the characterizing features defined in the attached claims.

Figure 2:
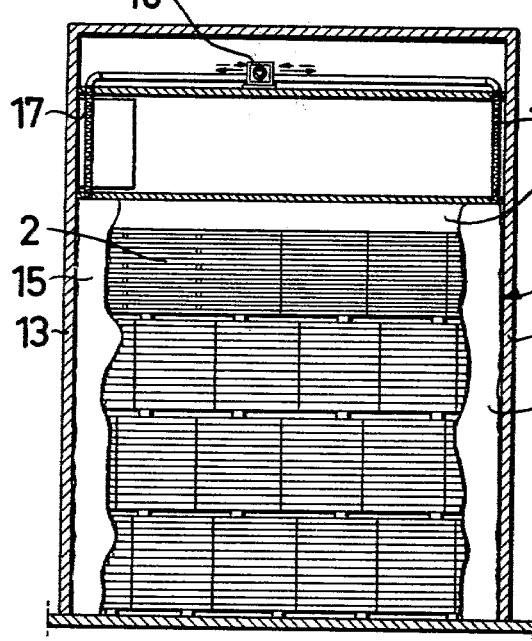
Figure 3:
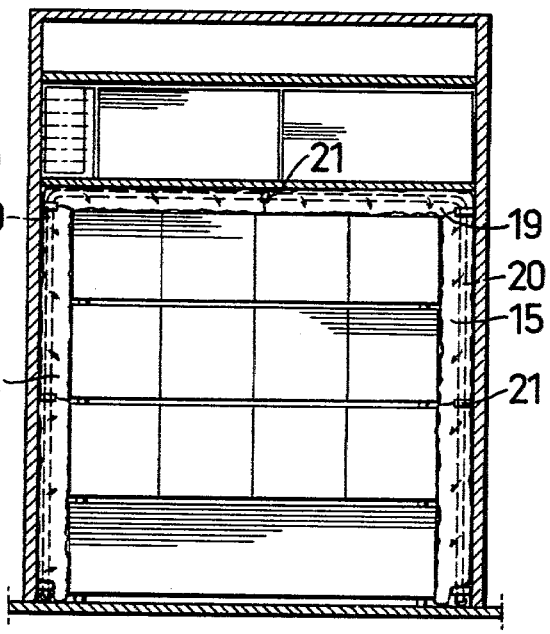
Figure 4:
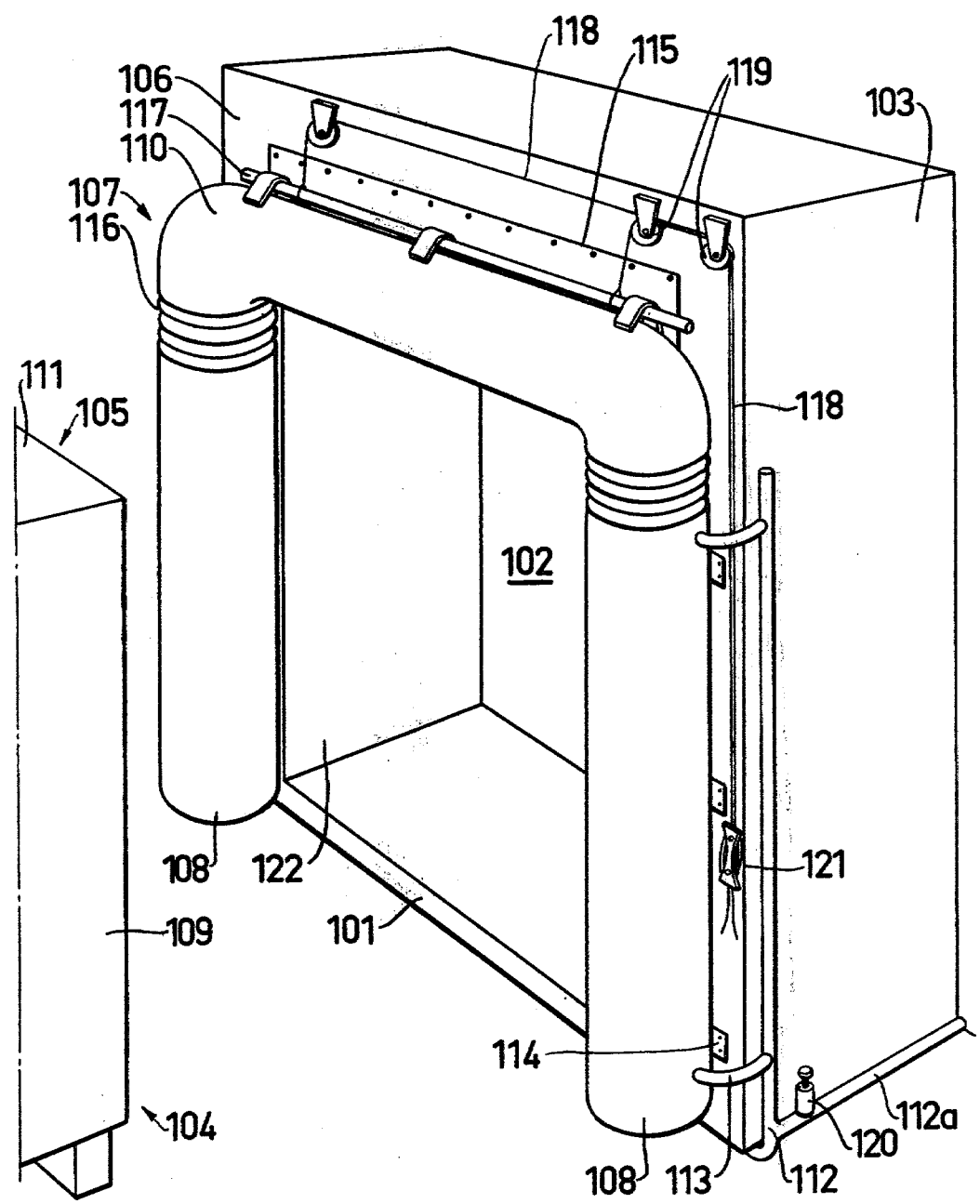

The invention is described in greater detail in the following description of the preferred embodiments, illustrated in to the accompanying drawings, in which FIG. 1 is a longitudinal section through the drying chamber of a chamber drier filled with timber and equipped with a first embodiment of the sealing device, FIG. 2 is a section along the line II–II in FIG. 1, FIG. 3 is a similar section as in FIG. 2, but through a modified embodiment, and FIG. 4 shows schematically and by a perspective view a second embodiment of the present sealing device arranged at a door opening of a store-house for sealing against a truck or trailer reversed against said opening.

In FIGS. 1-3, the numeral 1 designates in general a drying chamber containing a drying package assembled of a plurality of timber packages 2, which have been supplied into the chamber substantially perpendicularly to their longitudinal direction through a door opening 4, which in FIG. 1 is closed by means of an inclined liftable door 3. The drying chamber further includes a fan assembly 6 comprising one or more, preferably reversible fans 5, which assembly is located between the inner roof 7 of the drying chamber and a screen 8 supported immediately above the drying package and extending over the entire width of the drying chamber, and intended to blow drying air into the drying chamber and to cause it to circulate alternately in the directions indicated by the arrows 9 and 10. At the wall 11 of the drying chamber located directly opposite the door opening 4 a deflection screen 12 inclined against said wall is provided to facilitate the circulation of the drying air in the chamber and through the drying package. Due to its inclination in the closed position, the door 3 also acts as a deflection screen when being closed, in the same way as said deflection screen 12.

The timber packages 2 supplied into the drying chamber 1 have a length smaller than the width of the drying chamber between the sidewalls 13 and, therefore, there always is a free passageway for the drying air between the sidewalls 13 and the ends of the drying package. In order to prevent the drying air from flowing through these passageways, according to the present invention a number of sealing means 14 are provided at the side walls 13 of the drying chamber. Said sealing means 14 consist of inflatable hoses 15 of flexible material which are closed at their lower end and via conduits 16 and 17 at their upper end connected to a fan or pump 18 so constructed as to be able to pump air into and evacuate air from the hoses 15 on both sides of the drying package.

Each hose 15 is attached to the associated sidewall 13, for example by means of glue and/or other fastening means known per se, and may be dimensioned so as in inflated state to have a width or a diameter, which may amount to the difference between the width of the drying chamber and the length of the timber package, so that one hose is capable to of covering or filling out the entire intermediate space between a sidewall and one end of one or more timber packages stacked upon one another, even when this package or these packages are so offset laterally that their other ends are located not far away from the adjacent sidewall 13. When the timber packages are stacked reasonably straight upon each other, the hoses may be smaller, but in any event in their inflated state they should have a diameter exceeding half the difference between the width of the drying chamber and the length of the timber packages.

In the embodiment shown, three hoses 15 interconnected through the conduit 16 are arranged on each side of the drying package. Of these three hoses on one side two hoses are located one at each end of the drying package and one hose is located at the centre of the drying package. The hoses 15 on one side, furthermore, are located directly in front of the hoses on the other side, and each such pair of hoses communicates one hose with the other through a hose 19 attached to the lower surface of the screen 8 and inflatable like the hoses 15. Said hose 19 is capable in inflated state of preventing drying air from passing between the screen 8 and the upper surface of the drying package and, as the hoses 15, of guiding drying air into the drying package. Any number of hoses 15 may be provided on each side of the drying package, and these may be arranged so that there is one hose directly in front of each stack of timber packages 2. The number of hoses, further, depends on the length of the drying package and also of the length or depth of the drying chamber. It is not necessary, either, that each pair of hoses located directly in front of each other be coupled together one hose to the other through a horizontal hose, but this should be the case at the ends of the drying package. In certain cases, for example when there is a very small intermediate space between the upper surface of the drying package and the screen 8, the horizontal hoses 19 can be omitted entirely.

In the modified embodiment shown in FIG. 3 the hoses 15,19 in each vertical plane are attached by straps 21 about pipes 20 perforated along all their lengths, having an inverted U-shape and anchored at the sidewalls 13 and the screen 8. Said pipes 30 are closed at one lower end and interconnected at their other lower end by means of a conduit (not shown in FIG. 3), which extends parallel to the sidewall and is connected to a fan or pump provided to inflate the hoses and, respectively, evacuate the air therefrom. Discharge of the air from the hoses can take place by opening a valve inserted in the conduit. In this case, the fan or pump is required only for supplying inflating air and the hoses.

The hoses 15, 19 upon being inflated expand and are pressed against the drying package, and due to their flexibility conform themselves after to the shape of the drying package, as illustrated particularly in FIG. 2, and thereby effectively prevent drying air from passing both between the sidewalls 13 and the ends of the drying package and between the screen 8 and the upper surface of the drying package. The drying thereby also is rendered more efficient especially at the end portions of the drying package. After the timber has been dired, the air is sucked out of the hoses 15,19, which thereby contract against the sidewalls 13 and, respectively, screen 8 and, thus, do not constitute an obstacle to unloading the timber from the drying chamber nor to supplying new timber into the drying chamber, and are also in this way protected against damage. It also is possible to evacuate the air from the hoses 15 as mentioned above, by opening a valve which is inserted in the conduit. By this method of evacuation a contraction of the hoses against the sidewalls 13 and, screen 8 is not obtained, owing the fact that the hoses are made of a flexible material, however, the hoses collapse after the air has been evacuated and suspend slack along the sidewalls. This embodiment is most suitably used in cases when no hoses are provided beneath the screen 8.

It further is possible to attach the horizontal hoses 19 and the conduits 16 to the lower surface of a frame or the like, which is liftable and lowerable in relation to the screen 8. The sealing means thereby can be adjusted to the height of the drying package. In this case, of course, the upper portions of the hoses 15 must be loose relative to the respective sidewalls 13. Such an adjustment to the height of the drying package also is possible in the embodiment shown in FIG. 3, by designing the U-shaped pipes 20 as telescopic.

In FIG. 4 a further field of application for the present sealing device is illustrated by way of example. The numeral 101 designates a loading ramp in front of a door 102 to a store-house (not shown). The numeral 103 designates a superstructure, which encloses the door 102 and may be telescopic, in the same way as a bellows, from the store-house, although this is not apparent from the drawing. The numeral 104 designates the rear portion of a truck or trailer, which is provided with a stationary superstructure 105 or a box for the cargo, and is to be reversed against the loading ramp 101 to be loaded or unloaded,. Between truck or trailer superstructure 105 and the front side 106 of the superstructure 102 is located the device according to the invention for sealing the space between the truck and the storehouse when the truck or trailer has been reversed completely against the loading ramp 101.

According to the present invention, at said front wall 106 a sealing means 107 is provided which consists of an expansible, for example inflatable hose of tight flexible material, for example galon, plastic, preferably reinforced, or corresponding material. In the embodiment shown by way of example in the drawing, in which sealing is to be effected against the end of a superstructure on a truck or trailer, the hose has been arranged in the form of an inverted U and comprises two vertical legs 108 with a spaced relationship corresponding to the truck width or to the distance between the sidewalls 109 of the superstructure 105, and a transverse upper member 110 located on substantially the same level above the ground surface as the roof 111 of said superstructure 105. The legs 108, are provided to seal between the front wall and the sidewalls 109 of the superstructure 105, and the upper member 110 between the front wall 106 and the roof 111 of said superstructure 105.

In order to effect sealing, the hose is expansible, for example, by inflation with air or another gaseous medium from a pressure source (not shown) via conduits 112, 113, of which at least the conduits 113 connected to the vertical legs of the hose should be flexible, and of which, for example, the ingoing conduit 112a may be provided with a valve 120 for closing and opening for discharge of pressure medium when required. The pressure source preferably should be reversible so as to be able to operate also as an evacuation means for evacuating pressure medium from the hose. Due to the fact that the upper member 110 in the illustrated embodiment is designed integrally with the vertical legs 108, no conduits 113 need be connected thereto, because it is inflated via the legs 108. The hose is inflated after the truck or trailer has been reversed against the loading ramp. Thereby the hose is pressed both against the front wall 106 and the end portions of the superstructure 105 and tightly closes the intermediate space therebetween, even if the portion of said superstructure facing toward the sealing is non-uniform or not entirely parallel to said front wall 106, because the flexible hose conforms to the surface against which it is pressed. The intermediate space between the loading ramp 101 and the truck or trailer loading platform usually is covered by a gangway, but of course this space also may be sealed by so designing the hose that it also covers this space.

The vertical legs 108 can be attached to the wall 106 in many different ways, for example by gluing, although the drawing shows a plurality of fastening tips 114 fastened on the side of each leg facing toward the wall 106 or designed integrally with said side, which tips are nailed, screwed or glued onto the front wall. The upper member 110 of the sealing device, however, should be so connected to the front wall 106, that it can be lifted or lowered at least to a certain extent and thereby be adjusted to superstructures 105 of varying height. In the drawing, the upper member 110 is shown suspended from a cloth 115 attached from the front wall at another soft flexible material, which permits adjustment of the height position of the upper member. For this purpose also the vertical legs 108 are formed at their upper ends with folds or like an extensible bellows 116, which permit the upper member 110 to be lifted to the necessary extent. In order to prevent the upper member 110 from bending, i.e. from rising at its centre more than at the sides, a straight rigid rod 117 can be positioned adjacent the outer surface of the upper member, for example inserted through fastening eyes attached thereon, as shown in FIG. 4.

For lifting and lowering the upper member 110, hoist ropes 118 can be connected to the rod 117, as shown in the drawing, and thereafter extend over guide wheels 119, which are hingedly suspended at the wall 106, to an anchoring means 121 for the ropes 118 attached at a suitable height to the wall. By these ropes, thus, the upper member of the sealing device can be lifted and lowered as desired. In this connection it should also be mentioned that the cloth 115 can be omitted entirely and, instead, the ends of the rod be guided in guide bars (not shown), which are attached to the wall and prevent the upper member 110 from moving outward from the wall 106. Instead of the ropes 118 a remote-controlled piston-cylinder means connected to the rod 117 may be provided for lifting and lowering the upper member.

The invention, of course, also can be applied to sealing between an airplane or a ship and a sluice means to be attached to the intake thereof. The sealing device further can be provided directly at the storehouse and also be flush-mounted in its wall or in the surfaces defining a door opening. It is further contemplated that the sealing device may be incorporated into superstructure 105 of the truck or trailer. It is also possible to arrange a sealing device at the inner walls 122 of the extension. In this case the loading ramp 101 can and should be positioned at so low a height that the truck or trailer superstructure 105 can be received between walls 122. In this case the sealing takes place between the walls 122, including also the roof of the extension, and the sides 9 and roof 11 of the superstructure. The cross-section of the hose need not be circular as shown in the drawing, but can be given any other suitable shape, for example oval.

What I claim is:

1. A device for drying a stationary package by means of a circulating drying medium comprising:
   a drying chamber for confining said package and having walls spaced from said package to define a gap therebetween;
   means for circulating said drying medium through said drying chamber; and
   sealing means for filling and sealing selected portions of said gap for channeling the flow of said drying medium, said sealing means comprising at least one flexible hose disposed in said gap and inflatable to press against said walls and the surface of said package to fill said gap and effect a seal between said walls and said package,
   whereby when said hose is inflated said drying medium is prevented from flowing through said gap across said hose.

2. A device according to claim 1 further comprising at least one perforated pipe disposed within said hose through which a fluid passes for inflating or deflating said hose.

3. A device according to claim 1 wherein said hose comprises two substantially vertical legs disposed in said gap along the sides of said package and a substantially horizontal upper member connected to said legs and disposed in said gap above said package, said upper member and at least the upper portions of said legs being vertically adjustable to accommodate packages of varying heights.

4. A device according to claim 1 wherein said hose is substantially fluid-tight and is inflatable upon the application of positive static fluid pressure therewithin.

5. A device according to claim 1 wherein said drying chamber is a timber drying chamber, said package comprises a quantity of timber having opposite ends, and said sealing means comprises at least one hose substantially vertically disposed on each end of said package.

6. A device according to claim 5 wherein said drying chamber includes a screen disposed above said package, and said sealing means comprises at least one upper flexible hose disposed between said package and said screen and inflatable to fill and seal a portion of the gap therebetween.

7. A device according to claim 6 wherein said upper hose communicates with a hose on each end of said package.

8. A device according to claim 5 further comprising inflating means for supplying a pressurized fluid to said hoses, said inflating means comprising a pump and at least one conduit interconnecting said pump and said sealing means.

9. A device according to claim 8 further comprising deflating means for evacuating fluid from said hoses.

10. A device according to claim 9 wherein said inflating means and said deflating means comprise a reversible pump.

11. A device according to claim 7 wherein said sealing means comprises a plurality of pairs of substantially vertical hoses disposed on opposite ends of said package and a plurality of upper hoses, the opposed vertical hoses being arranged in substantially aligned pairs, and the hoses of each of said pairs being interconnected by a respective one of said upper hoses.

12. A device according to claim 11 wherein said vertical hoses are attached to the sidewalls of said drying chamber, and said upper hoses are attached to the underside of said screen.

13. A device according to claim 7 or 12 further comprising a perforated pipe disposed within each of said hoses through which fluid passes for inflating or deflating said hose.

14. A device according to claim 7 or 12 wherein said upper hoses and at least the upper portions of said vertical hoses are vertically movable to accommodate packages of various heights.

* * * * *